(12) United States Patent
Li et al.

(10) Patent No.: US 12,361,693 B1
(45) Date of Patent: Jul. 15, 2025

(54) METHOD AND APPARATUS FOR COLLABORATIVE END-TO-END LARGE MODEL-ORIENTED SELF-DRIVING TRAJECTORY DECISION-MAKING

(71) Applicant: Beijing University of Chemical Technology, Beijing (CN)

(72) Inventors: Zhiwei Li, Beijing (CN); Zhiyu Zhang, Beijing (CN); Fengli Lu, Beijing (CN); Kunfeng Wang, Beijing (CN); Huaping Liu, Beijing (CN); Qifan Tan, Beijing (CN); Wei Zhang, Beijing (CN); Li Wang, Beijing (CN); Tianyu Shen, Beijing (CN); Hui Li, Beijing (CN); Xiaoming Xie, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 18/956,059

(22) Filed: Nov. 22, 2024

(30) Foreign Application Priority Data

Feb. 27, 2024 (CN) .......................... 202410215363.0

(51) Int. Cl.
*G06V 10/00* (2022.01)
*B60W 60/00* (2020.01)
(Continued)

(52) U.S. Cl.
CPC ......... *G06V 10/806* (2022.01); *B60W 60/001* (2020.02); *G06F 40/20* (2020.01);
(Continued)

(58) Field of Classification Search
CPC .. G06V 10/806; G06V 10/7715; G06V 10/82; G06V 20/54; G06V 20/56; B60W 60/001; B60W 2420/403; G06F 40/20
See application file for complete search history.

(56) References Cited

U.S. PATENT DOCUMENTS

2020/0293064 A1\* 9/2020 Wu ........................ G06N 3/045
2021/0241026 A1 8/2021 Deng et al.
(Continued)

FOREIGN PATENT DOCUMENTS

CN 113378605 A 9/2021
CN 115761702 A 3/2023
(Continued)

*Primary Examiner* — Md K Talukder
(74) *Attorney, Agent, or Firm* — Bayramoglu Law Offices LLC (57) ABSTRACT

A method and an apparatus for collaborative end-to-end large model-oriented self-driving trajectory decision-making are provided. The method includes: processing an RGB image from ego vehicle, an RGB image from surrounding vehicle, and an RGB image from road-side by using a first feature extraction network to obtain a first image feature, a second image feature, and a third image feature, respectively; fusing first image feature, second image feature, and third image feature to obtain an image fusion feature; processing point cloud data of road-side to obtain a road-side point cloud feature; processing image fusion feature and road-side point cloud feature to obtain a first BEV feature and a second BEV feature; fusing first BEV feature and second BEV feature to obtain a fused BEV feature; and fusing prompt information and fused BEV feature to obtain text information, and then processing text information to obtain an ego vehicle trajectory decision-making result.

16 Claims, 5 Drawing Sheets

(51) Int. Cl.
  *G06F 40/20* (2020.01)
  *G06V 10/77* (2022.01)
  *G06V 10/80* (2022.01)
  *G06V 10/82* (2022.01)
  *G06V 20/54* (2022.01)
  *G06V 20/56* (2022.01)

(52) U.S. Cl.
  CPC .......... *G06V 10/7715* (2022.01); *G06V 10/82* (2022.01); *G06V 20/54* (2022.01); *G06V 20/56* (2022.01); *B60W 2420/403* (2013.01)

(56) References Cited

U.S. PATENT DOCUMENTS

| | | | |
|---|---|---|---|
| 2023/0122119 A1* | 4/2023 | Wu | G05D 1/0289 701/301 |
| 2023/0266144 A1* | 8/2023 | Yin | G01C 21/3852 701/532 |
| 2024/0020953 A1* | 1/2024 | Park | G06V 20/56 |

FOREIGN PATENT DOCUMENTS

| CN | 115775378 A | 3/2023 |
|---|---|---|
| CN | 117111085 A | 11/2023 |
| CN | 117152697 A | 12/2023 |

* cited by examiner

METHOD AND APPARATUS FOR COLLABORATIVE END-TO-END LARGE MODEL-ORIENTED SELF-DRIVING TRAJECTORY DECISION-MAKING

CROSS REFERENCE TO THE RELATED APPLICATIONS

This application is based upon and claims priority to Chinese Patent Application No. 202410215363.0, filed on Feb. 27, 2024, the entire contents of which are incorporated herein by reference.

TECHNICAL FIELD

The present application relates to the field of self-driving technologies, and in particular to a method and an apparatus for collaborative end-to-end large model-oriented self-driving trajectory decision-making.

BACKGROUND

Currently, existing collaborative perception or end-to-end algorithms encompass: the fusion of multi-sensor information features, which implements higher perception precision and a large perception range; the aggregation of features from consecutive video frames by using an attention mechanism, which incurs significant costs for real-time processing, has an attention drift problem, and prioritize earlier frames over later ones, resulting in performance degradation; and use of a large model to enhance video comprehension.

However, most existing self-driving large language models have no reasoning learning based on collaborative perception features, which further affects the accuracy of trajectory decision-making for vehicle driving.

SUMMARY

In view of this, the present application provides a method and an apparatus for collaborative end-to-end large model-oriented self-driving trajectory decision-making, aimed at addressing the aforementioned technical issues.

According to the first aspect, embodiments of the present application provide a method for collaborative end-to-end large model-oriented self-driving trajectory decision-making, comprising the steps of:
  obtaining a red green blue (RGB) image from an ego vehicle, an RGB image from a surrounding vehicle, an RGB image from a road-side, and point cloud data of the road-side in a target region at a current moment;
  processing the RGB image from the ego vehicle, the RGB image from the surrounding vehicle, and the RGB image from the road-side by using a first feature extraction network to obtain a first image feature, a second image feature, and a third image feature, respectively;
  fusing the first image feature, the second image feature, and the third image feature to obtain an image fusion feature;
  processing the point cloud data of the road-side by using a second feature extraction network to obtain a road-side point cloud feature;
  processing the image fusion feature and the road-side point cloud feature to obtain a first BEV feature and a second BEV feature;
  fusing the first BEV feature and the second BEV feature to obtain a fused BEV feature; and
  fusing prompt information representing a user intention and the fused BEV feature by using a large vision language model to obtain text information, and then processing the text information by using a natural language large model to obtain an ego vehicle trajectory decision-making result.

Further, the step of fusing the first image feature, the second image feature, and the third image feature to obtain an image fusion feature comprises the steps of:
  processing the first image feature by using a first 1×1 convolution layer to obtain a first key vector $K^{sv}$, a first value vector $V^{sv}$, and a query vector $Q^{sv}$;
  processing the second image feature by using a second 1×1 convolution layer to obtain a second key vector $K^{VR}$ and a second value vector $V^{VR}$; and
  processing the third image feature by using a third 1×1 convolution layer to obtain a third key vector $K^{vr}$ and a third value vector $V^{vr}$,
  where, a first fusion feature $F_1$ is:

$$F_1 = \text{softmax}\left(\frac{Q^{sv}K^{sv}}{\sqrt{d_k}}\right)V^{sv},$$

a second fusion feature $F_2$ is:

$$F_2 = \text{softmax}\left(\frac{Q^{sv}K^{VR}}{\sqrt{d_k}}\right)V^{VR},$$

a third fusion feature $F_3$ is:

$$F_3 = \text{softmax}\left(\frac{Q^{sv}K^{vr}}{\sqrt{d_k}}\right)V^{vr},$$

the image fusion feature $F_{im}$ is:
  $F_{im} = F_1 + F_2 + F_3$,
  where, $d_k$ denotes a dimension of the first key vector $K^{sv}$.

Further, the step of processing the image fusion feature and the road-side point cloud feature to obtain a first BEV feature and a second BEV feature comprises the steps of:
  processing the image fusion feature by using a deformable cross-attention network to obtain the first BEV feature $F_{im}^{BEV}$:
  $F_{im}^{BEV} = \Sigma_i \Sigma_j \text{DeformAttn}(Q, P(S_j, F_{im}^i))$,
  where, Q is a to-be-learned BEV parameter; $P(S_j, F_{im}^i)$ denotes a result of projecting a $j^{th}$ three-dimensional point $S_j$ onto an $i^{th}$ channel $F_{im}^i$ of the image fusion feature $F_{im}$; and DeformAttn( ) denotes the deformable cross-attention network;
  processing the road-side point cloud feature by using a deformable cross-attention mechanism network to obtain the second BEV feature $F_{LiD}^{BEV}$:
  $F_{LiD}^{BEV} = \Sigma_i \Sigma_j \text{DeformAttn}(Q, P(S_j, F_{LiD}^i))$,
  where, $P(S_j, F_{LiD}^i)$ denotes a result of projecting the $j^{th}$ three-dimensional point $S_j$ onto an $i^{th}$ channel $F_{LiD}$ of the road-side point cloud feature $F_{LiD}^i$; and
  transforming the second BEV feature $F_{LiD}^{BEV}$ into a coordinate system with an ego vehicle as the center.

Further, the step of fusing the first BEV feature and the second BEV feature to obtain a fused BEV feature comprises the steps of:

performing dimension reduction on the first BEV feature by using a first 3×3 convolution layer to obtain a dimension-reduced first BEV feature;

processing the dimension-reduced first BEV feature by using an adaptive global average pooling operation to obtain a first global feature;

performing dimension reduction on the first global feature by using a fourth 1×1 convolution layer to obtain a dimension-reduced first global feature;

normalizing the dimension-reduced first global feature to obtain a first weight feature map;

calculating a product of the first BEV feature and the first weight feature map by using a first multiplier to obtain a weighted first BEV feature;

performing dimension reduction on the second BEV feature by using a second 3×3 convolution layer to obtain a dimension-reduced second BEV feature;

processing the dimension-reduced second BEV feature by using a second adaptive global average pooling operation to obtain a second global feature;

performing dimension reduction on the second global feature by using a fifth 1×1 convolution layer to obtain a dimension-reduced second global feature;

normalizing the dimension-reduced second global feature to obtain a second weight feature map;

calculating a product of the second BEV feature and the second weight feature map by using a second multiplier to obtain a weighted second BEV feature; and concatenating the weighted first BEV feature and the weighted second BEV feature to obtain the fused BEV feature.

Further, the first feature extraction network is ResNet101; and the second feature extraction network is VoxelNet.

Further, the method further includes: a step of performing joint training on the first feature extraction network, the second feature extraction network, the first 1×1 convolution layer, the second 1×1 convolution layer, the third 1×1 convolution layer, the deformable cross-attention network, the first 3×3 convolution layer, the fourth 1×1 convolution layer, the second 3×3 convolution layer, and the fifth 1×1 convolution layer.

According to the second aspect, embodiments of the present application provide an apparatus for collaborative end-to-end large model-oriented self-driving trajectory decision-making, including:

an obtaining unit, configured to obtain an RGB image from an ego vehicle, an RGB image from a surrounding vehicle, an RGB image from a road-side, and point cloud data of the road-side in a target region at a current moment;

a first processing unit, configured to process the RGB image from the ego vehicle, the RGB image from the surrounding vehicle, and the RGB image from the road-side by using a first feature extraction network to obtain a first image feature, a second image feature, and a third image feature, respectively;

a first fusion unit, configured to fuse the first image feature, the second image feature, and the third image feature to obtain an image fusion feature;

a second processing unit, configured to process the point cloud data of the road-side by using a second feature extraction network to obtain a road-side point cloud feature;

a third processing unit, configured to process the image fusion feature and the road-side point cloud feature to obtain a first BEV feature and a second BEV feature;

a second fusion unit, configured to fuse the first BEV feature and the second BEV feature to obtain a fused BEV feature; and a trajectory decision-making unit, configured to fuse prompt information representing a user intention and the fused BEV feature by using a large vision language model to obtain text information, and then process the text information by using a natural language large model to obtain an ego vehicle trajectory decision-making result.

According to the third aspect, embodiments of the present application provides an electronic device, including: a memory, a processor, and a computer program stored in the memory and configured to be executed by the processor, where the processor, when executing the computer program, implements the method in the embodiments of the present application.

According to the fourth aspect, embodiments of the present application provide a computer-readable storage medium, the computer-readable storage medium storing a computer program, the computer program being run by a processor to implement the method in the embodiments of the present application.

BRIEF DESCRIPTION OF THE DRAWINGS

To describe the technical solutions in specific embodiments of the present application or the prior art more clearly, the following briefly introduces the accompanying drawings required for describing the specific embodiments or the prior art. Apparently, the accompanying drawings in the following description show some embodiments of the present application, and a person of ordinary skill in the art may still derive other drawings from these accompanying drawings without creative efforts.

DETAILED DESCRIPTION OF THE EMBODIMENTS

To make the objectives, technical solutions, and advantages of embodiments of the present application clearer, the following clearly and completely describes the technical solutions in embodiments of the present application with reference to the accompanying drawings in embodiments of the present application. It is clear that the described embodiments are merely some rather than all of embodiments of the present application. The components in the embodiments of the present application generally described and shown in the accompanying drawings herein may be arranged and designed in a variety of different configurations.

Accordingly, the following detailed description of the embodiments of the present application provided in the accompanying drawings is not intended to limit the scope of the present application for which protection is claimed, but merely indicates selected embodiments of the present application. All other embodiments obtained by a person of ordinary skill in the art based on embodiments of the present application without creative efforts shall fall within the protection scope of the present application.

First, the design concept of the embodiments of the present application are briefly described.

End-to-end self-driving has become the trend of self-driving, is the key to advanced self-driving, and is also the ultimate objective of self-driving. The core technologies of the end-to-end self-driving include perception, decision-making, planning, and motion control technologies. However, most existing automatic end-to-end self-driving technologies are oriented to single-vehicle perception and have some limitations:

Limited perception range: A single-vehicle intelligent system mainly depends on sensors such as a camera, a LiDAR, a radar, and an ultrasonic sensor inside a vehicle to perceive a surrounding environment. These sensors have limited perception ranges and may not adequately fully cover a complex traffic environment.

Limited decision-making, planning, and control capabilities: The single-vehicle intelligent system usually typically engages in decision-making based on data of the sensors inside the vehicle. Consequently, it struggles to plan effectively in a complex traffic situation, and further a moving trajectory cannot be controlled precisely, causing certain risks to traffic safety.

For the foregoing limitations, in view of the advantage that in vehicle-road collaboration, a vehicle performs real-time communication and information sharing with the road infrastructure and other vehicles to obtain wider perception and information sharing, the spatio-temporal fusion of different viewing angles of an ego vehicle, viewing angles of different vehicles with respect to the ego vehicle, and a viewing angle of a road-side, the state of motion of the ego vehicle, and the interaction of features of different viewing angles from a surrounding vehicle and the road-side are taken into consideration, so that the accuracy of end-to-end self-driving decision-making can be improved, thereby enhancing the safety of self-driving vehicles.

Existing collaborative perception or end-to-end algorithms mainly include: (1) the fusion of multi-sensor information features, which implements higher perception precision and a large perception range; (2) the aggregation of features from consecutive video frames by using an attention mechanism, which incurs significant costs for real-time processing, has an attention drift problem, and prioritize earlier frames over later ones, resulting in performance degradation; and (3) use of a large model to enhance video comprehension. However, most existing self-driving large language models have no reasoning learning based on collaborative perception features, which further affects the accuracy of trajectory decision-making.

To address the aforementioned technical issues, the present application provides a method for collaborative end-to-end large model-oriented self-driving trajectory decision-making, including: obtaining an RGB image from an ego vehicle, an RGB image from a surrounding vehicle, an RGB image from a road-side, and point cloud data of the road-side in a target region at a current moment; processing the RGB image from the ego vehicle, the RGB image from the surrounding vehicle, and the RGB image from the road-side by using a first feature extraction network to obtain a first image feature, a second image feature, and a third image feature, respectively; fusing the first image feature, the second image feature, and the third image feature to obtain an image fusion feature; processing the point cloud data of the road-side by using a second feature extraction network to obtain a road-side point cloud feature; processing the image fusion feature and the road-side point cloud feature to obtain a first BEV feature and a second BEV feature; fusing the first BEV feature and the second BEV feature to obtain a fused BEV feature; and fusing prompt text information and the fused BEV feature by using a large vision language model to obtain context information, and processing the context information by using a natural language large model to obtain an ego vehicle trajectory decision-making result.

Compared with the prior art, the advantages of the present application are as follows:

1. In the method for trajectory decision-making for an end-to-end self-driving vehicle with collaborative perception provided in the present application, a vehicle-road collaboration data set is used, so that a visual blind spot of a vehicle can be better perceived.
2. In the present application, a spatio-temporal fusion structure with multiple viewing angles of an ego vehicle, a viewing angle from a surrounding vehicle, a viewing angle of infrastructure of a road-side, and multimodal data of a LiDAR of the road-side is used, a BEV coordinate system with the ego vehicle as the center is established, and a data field of a series perception model is expanded, so that richer features can be supplemented, which provides a solid basis for the accuracy of decision-making.
3. In the present application, a natural language decision-making large model that connects a BEV feature and a text feature is used, and multi-viewing angle reasoning and spatial reasoning are performed in combination with a natural language and a BEV feature, to perform precise ego vehicle trajectory decision-making.

After the application scenarios and design ideas of embodiments of the present application are introduced, the technical solutions provided in the embodiments of the present application are described below.

Figure 1:
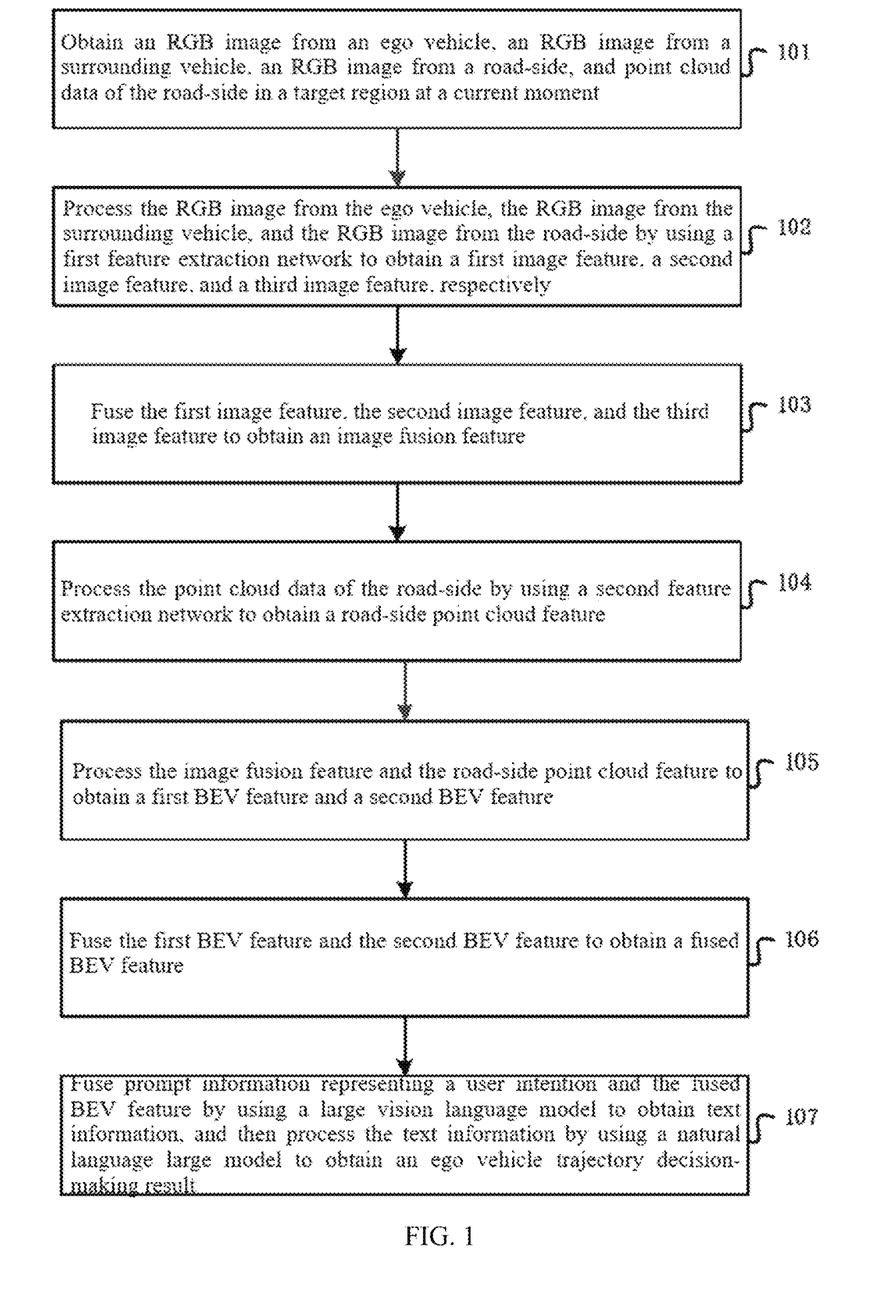
FIG. 1 is a flowchart of a method for collaborative end-to-end large model-oriented self-driving trajectory decision-making according to an embodiment of the present application.

As shown in FIG. 1, embodiments of the present application provide a method for collaborative end-to-end large model-oriented self-driving trajectory decision-making, including the following steps.

Step 101: Obtain an RGB image from an ego vehicle, an RGB image from a surrounding vehicle, an RGB image from a road-side, and point cloud data of the road-side in a target region at a current moment.

For example, the RGB image is a three-channel image acquired with a camera. The point cloud data is a number of points about an external surface of an object that are acquired with a LiDAR. Each point includes coordinates x, y, and z and a reflection intensity r.

Cameras of four viewing angles are installed on a vehicle: a front viewing angle camera, a left-side viewing angle camera, a right-side viewing angle camera, and a rear viewing angle camera, to acquire 360-degree blind spot-free image information of an ego vehicle and a surrounding vehicle. The RGB image from the ego vehicle includes a front viewing angle image, a left-side viewing angle image, a right-side viewing angle image, and a rear viewing angle image from the ego vehicle. To reduce costs, a LiDAR is installed at the road-side only in this embodiment and configured to acquire continuous point cloud data for use by vehicles nearby.

Specifically, a user intention may be obtained through prompt information, and is, for example, turning left, turning right, or speeding up moving forward. One RGB image is selected from the RGB images of the four cameras according to the user intention, and the target region at the current moment is determined.

A corresponding RGB image acquired by the surrounding vehicle, a corresponding RGB image acquired by the road-side, and the point cloud data are obtained according to the target region.

For example, when the user intention is speeding up moving forward, the selected RGB image is from the front viewing angle camera, the target region is a front region, the surrounding vehicle is a vehicle in front of the ego vehicle, and the RGB image from the surrounding vehicle is from the rear viewing angle camera of the surrounding vehicle.

Step 102: Process the RGB image from the ego vehicle, the RGB image from the surrounding vehicle, and the RGB image from the road-side by using a first feature extraction network to obtain a first image feature, a second image feature, and a third image feature, respectively.

In this embodiment, the first feature extraction network is a ResNet101 network. The RGB image from the ego vehicle, the RGB image from the surrounding vehicle, and the RGB image from the road-side are processed by using the ResNet101 network to obtain an image feature of the ego vehicle, an image feature of the surrounding vehicle, and an image feature of the road-side.

Next, the image features of the vehicle and the road-side are synchronized to address the issue of a difference in perception features at the vehicle and the road-side due to a delay in a process of communication transmission of the vehicle and the road-side. A coordinate system with the ego vehicle as the center is established. Space coordinate viewing angle conversion is performed on position information of target features of the vehicle and the road-side to create the coordinate system with the ego vehicle as the center. In this way, a detection target is mapped into the coordinate system with the ego vehicle as the center, to address the issue of a detection error caused when deviation angles or other information in the target features of the vehicle and the road-side are in different coordinate systems. Feature information of multiple viewing angles is fused by using a long-distance capture capability of a cross-attention mechanism, to enhance collaborative perception capabilities of the ego vehicle, the surrounding vehicle, and the road-side, thereby reducing a rate of accidents caused due to a communication loss at the vehicle and the road-side.

Specifically, obtained perception feature sequences of the ego vehicle, the surrounding vehicle, and the road-side are respectively stored in an ego vehicle perception feature queue (vehicle_queue1), a surrounding vehicle perception feature queue (vehicle_queue2), and a road-side feature perception queue (vehicle_queue). A timer is set, and is periodically triggered at intervals of T to obtain queue fronts of a vehicle-end queue and a road-side queue, and a current timestamp of a feature set of the ego vehicle is used for reference to perform timeliness check. Specifically, $T_{v1}$ denotes a timestamp of a feature set of the ego vehicle, $T_{v2}$ denotes a timestamp of a feature set of the surrounding vehicle, $T_r$ denotes a timestamp of a feature set of the road-side, and $T_s$ denotes a timeliness threshold. If $T_{v2}-T_{v1}>T_s$ and $T_r-T_{v1}>T_s$ indicate that the feature set has lag messages and is not very helpful to perception fusion, this feature set is discarded. Conversely, if timestamp differences of the two are both less than the timeliness threshold $T_s$, it is determined that in this case, the feature set that needs to be fused meets the timeliness required for perception collaboration. The value of the timeliness threshold $T_s$ depends on perception frequencies of the vehicle and the road-side.

A coordinate system with the ego vehicle as the center is established. Space coordinate viewing angle conversion is performed on position information of target features of the vehicle and the road-side to create the coordinate system with the ego vehicle as the center. In this way, a detection target is mapped into the coordinate system with the ego vehicle as the center, to address the issue of a detection error caused when deviation angles or other information in the target features of the vehicle and the road-side are in different coordinate systems.

Specifically, based on images of cameras of the ego vehicle from different viewing angles and an ego vehicle steering angle θ that appears in ego vehicle images appearing in cameras of the surrounding vehicle and the road-side, with a feature center point [x, y] of the ego vehicle as the center of rotation, with reference to a selection matrix, a target feature in multiple viewing angles is rotated into a world coordinate system to obtain rotated coordinates [x', y']:

$$\begin{bmatrix} x' \\ y' \end{bmatrix} = \begin{bmatrix} \cos\theta & -\sin\theta \\ \sin\theta & \cos\theta \end{bmatrix} * \begin{bmatrix} x \\ y \end{bmatrix}.$$

Next, with reference to a translation matrix, the rotated coordinates of the target feature are translated into the world coordinate system to obtain a coordinate system with the ego vehicle as the center:

$$\begin{bmatrix} x''_n \\ y''_n \end{bmatrix} = \begin{bmatrix} x'_n \\ y'_n \end{bmatrix} + \begin{bmatrix} x_c \\ y_c \end{bmatrix},$$

where, $$\begin{bmatrix} x''_{n'} \\ y''_{n'} \end{bmatrix}$$

denotes target vertex coordinates in the world coordinate system, $$\begin{bmatrix} x'_n \\ y'_n \end{bmatrix}$$

denotes rotated vertex coordinates, $$\begin{bmatrix} x_c \\ y_c \end{bmatrix}$$

denotes vertex coordinates of the target feature in the original multiple viewing angles, and $n \in \{1, 2, 3, 4\}$ denotes four vertices of the target feature.

The perception features of the vehicle and the road-side are synchronized to address the issue of a difference in perception features at the vehicle and the road-side due to a delay in a process of communication transmission of the vehicle and the road-side.

Step 103: Fuse the first image feature, the second image feature, and the third image feature to obtain an image fusion feature.

Figure 2:
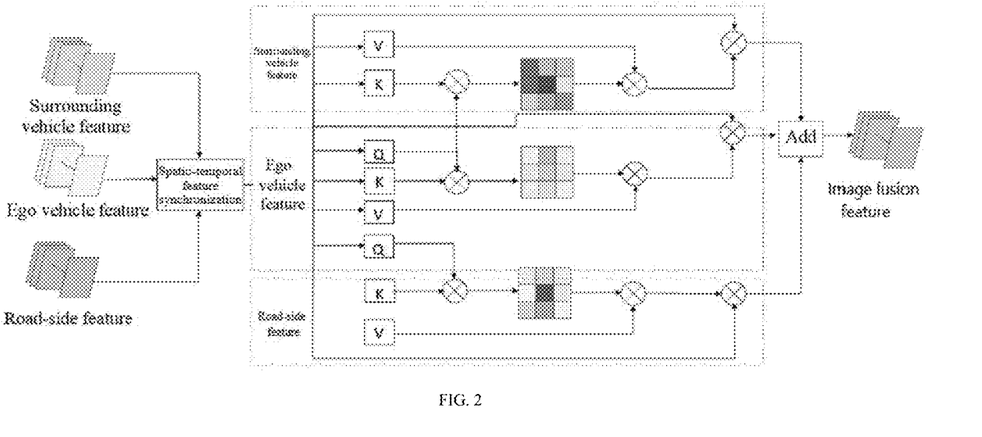
FIG. 2 is a schematic diagram of image feature fusion according to an embodiment of the present application.

In this embodiment, with reference to a cross-attention mechanism, feature information of multiple viewing angles is fused by using a long-distance capture capability of a cross-attention mechanism, to enhance collaborative perception capabilities of the ego vehicle, the surrounding vehicle, and the road-side, thereby reducing a rate of accidents caused due to a communication loss at the vehicle and the road-side.

As shown in FIG. 2, step 103 specifically includes the steps of:
processing the first image feature by using a first 1×1 convolution layer to obtain a first key vector $K^{sv}$, a first value vector $V^{sv}$, and a query vector $Q^{sv}$;
processing the second image feature by using a second 1×1 convolution layer to obtain a second key vector $K^{VR}$ and a second value vector $V^{VR}$; and
processing the third image feature by using a third 1×1 convolution layer to obtain a third key vector $K^{vr}$ and a third value vector $V^{vr}$,
where, a first fusion feature $F_1$ is:

$$F_1 = \text{softmax}\left(\frac{Q^{sv} K^{sv}}{\sqrt{d_k}}\right) V^{sv},$$

a second fusion feature $F_2$ is:

$$F_2 = \text{softmax}\left(\frac{Q^{sv} K^{VR}}{\sqrt{d_k}}\right) V^{VR},$$

a third fusion feature $F_3$ is:

$$F_3 = \text{softmax}\left(\frac{Q^{sv} K^{vr}}{\sqrt{d_k}}\right) V^{vr},$$

the image fusion feature $F_{im}$ is:

$$F_{im} = F_1 + F_2 + F_3,$$

where, $d_k$ denotes a dimension of the first key vector $K^{sv}$.

Step 104: Process the point cloud data of the road-side by using a second feature extraction network to obtain a road-side point cloud feature.

In this embodiment, the second feature extraction network is a VoxelNet network, and the point cloud data of the road-side is processed by using the VoxelNet network to obtain the road-side point cloud feature $F_{LiD}$.

Step 105: Process the image fusion feature and the road-side point cloud feature to obtain a first BEV feature and a second BEV feature.

For example, a bird's eye view (BEV) is an image or a view of a scene observed from above (with bird's eyes), and is usually used for vehicle perception and path planning.

Camera image collaborative perception features $F_{im}$ and LiDAR features $F_{LiD}$ of the vehicle and the road-side are not in a same coordinate system. With reference to the BEV coding technique, BEV features in the two modes are aligned in the present invention to improve the precision of feature fusion between the modes, thereby making better use of the complementary advantage between the modes. However, the coordinates of the perception features of the vehicle (the ego vehicle and the surrounding vehicle) and the road-side after the alignment do not use the ego vehicle as the center. In the present invention, the coordinates of the BEV feature perceived at the road-side are transformed into the coordinate system with the ego vehicle as the center, to improve the fusion effect of features of different modes and make use of the advantages such as high-precision distance measurement, a strong anti-interference capability, and long-distance perception of a LiDAR, thereby improving the robustness.

The image fusion feature is processed by using a deformable cross-attention mechanism network to obtain the first BEV feature $F_{im}^{BEV}$.

$$F_{im}^{BEV} = \Sigma_i \Sigma_j \text{DeformAttn}(Q, P(S_j, F_{im}^{i})),$$

where, $Q$ is a to-be-learned BEV parameter; $P(S_j, F_{im}^{i})$ denotes a result of projecting a $j^{th}$ three-dimensional point $S_j$ onto an $i^{th}$ channel $F_{im}^{i}$ of the image fusion feature $F_{im}$.

The road-side point cloud feature is processed by using a deformable cross-attention mechanism network to obtain the second BEV feature $F_{LiD}^{BEV}$.

$$F_{LiD}^{BEV} = \Sigma_i \Sigma_j \text{DeformAttn}(Q, P(S_j, F_{LiD}^{i})),$$

where, $P(S_j, F_{LiD}^{i})$ denotes a result of projecting the $j^{th}$ three-dimensional point Si onto an $i^{th}$ channel $F_{LiD}$ of the road-side point cloud feature $F_{LiD}^{i}$.

The second BEV feature $F_{LiD}^{BEV}$ is transformed into a coordinate system with an ego vehicle as the center to obtain a transformed second BEV feature $F_{LiD}^{BEV^i}$:

$$\begin{cases} X_{F_{LiD}^{BEV^i}} = \left(X_{F_{LiD}^{BEV}} - X_{F_{im}^{BEV}}\right)\cos(\theta) + \left(X_{F_{LiD}^{BEV}} - X_{F_{im}^{BEV}}\right)\sin(\theta) \\ Y_{F_{LiD}^{BEV^i}} = \left(Y_{F_{LiD}^{BEV}} - Y_{F_{im}^{BEV}}\right)\sin(\theta) + \left(Y_{F_{LiD}^{BEV}} - Y_{F_{im}^{BEV}}\right)\cos(\theta) \end{cases},$$

where, $(X_{F_{LiD}^{BEV}}, Y_{F_{LiD}^{BEV}})$ denotes two-dimensional coordinates of the feature $F_{LiD}^{BEV^i}$; $(X_{F_{LiD}^{BEV}}, Y_{F_{LiD}^{BEV}})$ denotes two-dimensional coordinates of the feature extraction $F_{LiD}^{BEV}$; $(X_{F_{im}^{BEV}}, Y_{F_{im}^{BEV}})$ denotes two-dimensional coordinates of the feature extraction $F_{im}^{BEV}$; and $\theta$ denotes an ego vehicle steering angle at the current moment.

Step 106: Fuse the first BEV feature and the second BEV feature to obtain a fused BEV feature.

Figure 3:
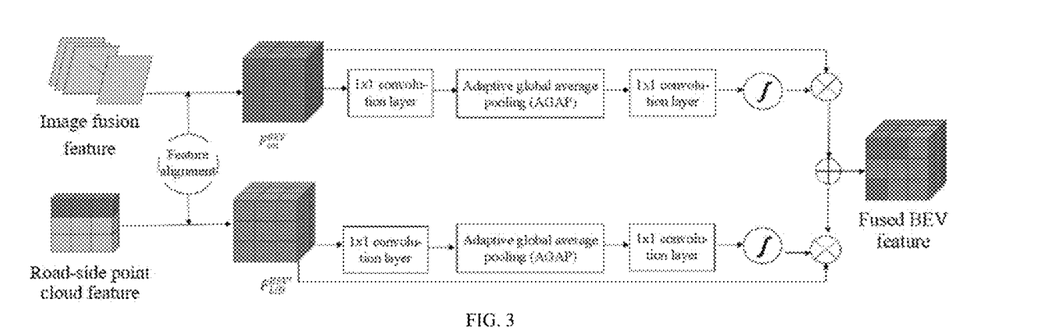
FIG. 3 is a schematic diagram of BEV feature fusion according to an embodiment of the present application.

Interactive fusion is performed on the camera image collaborative perception features $F_{im}$ and LiDAR BEV features $F_{LiD}^{BEV^i}$ of the vehicle and the road-side.

Through a multimodal feature interactive fusion mechanism, interactive fusion is performed on vehicle-road collaboration BEV features $F_{im}^{BEV}$ and the LiDAR BEV features $F_{LiD}^{BEV^i}$ that are aligned, thereby keeping more information features. Through a feature fusion strategy of normalizing a channel weight, a learned channel weight is used to balance between BEV features in a LiDAR mode and a camera mode, so that the model can automatically select a modal feature more useful for target detection, thereby improving the performance of the model. In a feature fusion mechanism of normalizing a channel weight, a dimensional weight vector of each mode is learned, and the vector remains unchanged in a training process. An element of each weight vector represents a relative importance of a corresponding channel in a fusion result. Before fusion, all weight vectors are standardized to ensure that a sum of weights of all the channels is 1.

Specifically, as shown in FIG. 3, step 106 specifically includes the steps of:

performing dimension reduction on the first BEV feature by using a first 3×3 convolution layer to obtain a dimension-reduced first BEV feature;

processing the dimension-reduced first BEV feature by using an adaptive global average pooling operation to obtain a first global feature;

performing dimension reduction on the first global feature by using a fourth 1×1 convolution layer to obtain a dimension-reduced first global feature;

normalizing the dimension-reduced first global feature to obtain a first weight feature map;

calculating a product of the first BEV feature and the first weight feature map by using a first multiplier to obtain a weighted first BEV feature;

performing dimension reduction on the second BEV feature by using a second 3×3 convolution layer to obtain a dimension-reduced second BEV feature;

processing the dimension-reduced second BEV feature by using a second adaptive global average pooling operation to obtain a second global feature;

performing dimension reduction on the second global feature by using a fifth 1×1 convolution layer to obtain a dimension-reduced second global feature;

normalizing the dimension-reduced second global feature to obtain a second weight feature map;

calculating a product of the second BEV feature and the second weight feature map by using a second multiplier to obtain a weighted second BEV feature; and concatenating the weighted first BEV feature and the weighted second BEV feature to obtain the fused BEV feature.

Figure 4:
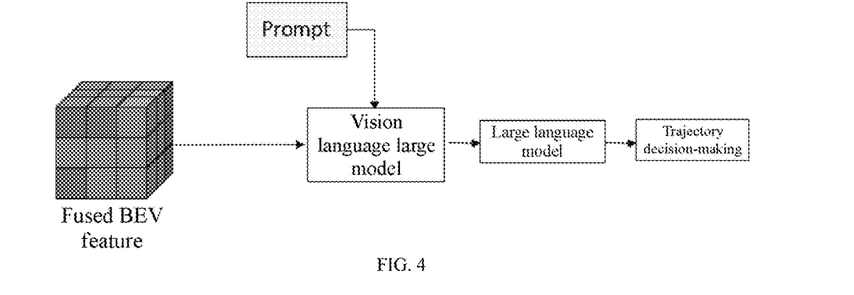
FIG. 4 is a schematic diagram of a trajectory decision-making step according to an embodiment of the present application.

Step 107: Fuse prompt information representing a user intention and the fused BEV feature by using a large vision language model to obtain text information, and then process the text information by using a natural language large model to obtain an ego vehicle trajectory decision-making result.

As shown in FIG. 4, with reference to the use of natural language description in self-driving, a prompt language feature and a fused BEV feature are fused in this embodiment to enrich the BEV feature, and a large vision language model (LVLM) is used to provide precise information for subsequent natural language large model (LLM) reasoning.

Trajectory decision-making output is a critical part in self-driving, and involves a future running trajectory of an ego vehicle, a control signal of the ego vehicle, and real-time detection of a surrounding environment. The running trajectory, a corresponding control signal text, and a physical target detection result are outputted simultaneously.

The ego vehicle trajectory decision-making result refers to a running trajectory of the ego vehicle and a control signal of the ego vehicle at a next moment, appearing in a text form to prompt the ego vehicle to speed up, slow down, stop, keep a current speed, steer, change a lane, or the like. In addition, a corresponding reason, for example, a vehicle sign, a speed limit sign, is provided.

For example, the trajectory decision-making result is that the ego vehicle is about to travel (move forward, turn left or right by 20°, or the like) at a speed of 0.5 km/h. Reason: There is traffic light ahead on the road, or there is a pedestrian ahead, or there is a speed limit ahead. In addition, a real-time perception detection result of a surrounding environment acquired by multi-field of view cameras may be outputted, a detected physical target is displayed in an outputted running trajectory, and a corresponding text description of the physical target is outputted.

In addition, the method further includes: a step of performing joint training on the first feature extraction network, the second feature extraction network, the first 1×1 convolution layer, the second 1×1 convolution layer, the third 1×1 convolution layer, the deformable cross-attention network, the first 3×3 convolution layer, the fourth 1×1 convolution layer, the second 3×3 convolution layer, and the fifth 1×1 convolution layer.

Figure 5:
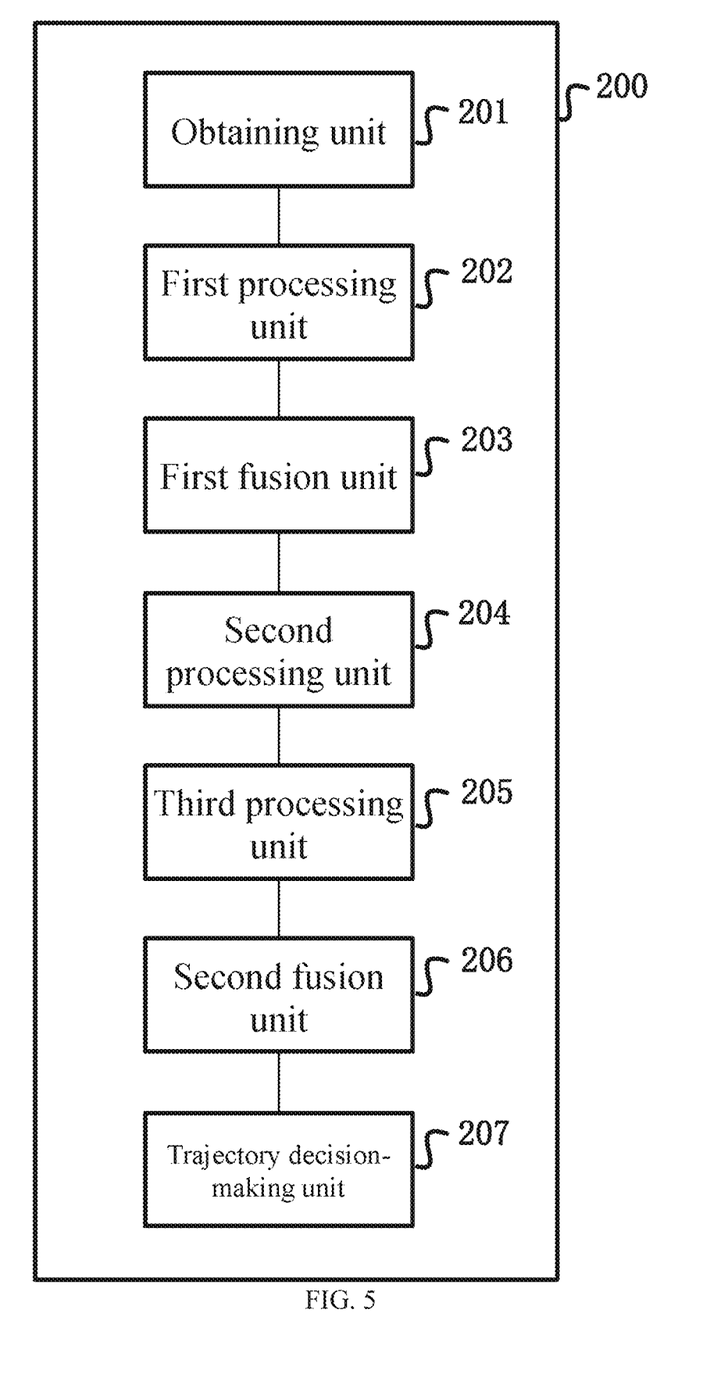
FIG. 5 is a functional structural diagram of an apparatus for collaborative end-to-end large model-oriented self-driving trajectory decision-making according to an embodiment of the present application.

Based on the foregoing embodiment, embodiments of the present application provide an apparatus for collaborative end-to-end large model-oriented self-driving trajectory decision-making. Referring to FIG. 5, an apparatus 200 for collaborative end-to-end large model-oriented self-driving trajectory decision-making provided in the embodiments of the present application at least includes:

an obtaining unit 201, configured to obtain an RGB image from an ego vehicle, an RGB image from a surrounding vehicle, an RGB image from a road-side, and point cloud data of the road-side in a target region at a current moment;

a first processing unit 202, configured to process the RGB image from the ego vehicle, the RGB image from the surrounding vehicle, and the RGB image from the road-side by using a first feature extraction network to obtain a first image feature, a second image feature, and a third image feature, respectively;

a first fusion unit 203, configured to fuse the first image feature, the second image feature, and the third image feature to obtain an image fusion feature;

a second processing unit 204, configured to process the point cloud data of the road-side by using a second feature extraction network to obtain a road-side point cloud feature;

a third processing unit 205, configured to process the image fusion feature and the road-side point cloud feature to obtain a first BEV feature and a second BEV feature;

a second fusion unit 206, configured to fuse the first BEV feature and the second BEV feature to obtain a fused BEV feature; and a trajectory decision-making unit 207, configured to fuse prompt information representing a user intention and the fused BEV feature by using a large vision language model to obtain text information, and then process the text information by using a natural language large model to obtain an ego vehicle trajectory decision-making result.

It needs to be noted that the principle of addressing the technical issue of the apparatus 200 for collaborative end-to-end large model-oriented self-driving trajectory decision-making provided in this embodiment of the present application is similar to that of the method provided in the embodiments of the present application. Therefore, for the implementation of the apparatus 200 for collaborative end-to-end large model-oriented self-driving trajectory decision-making provided in this embodiment of the present application, refer to the implementation of the method provided in the embodiments of the present application. Details are not described again.

Figure 6:
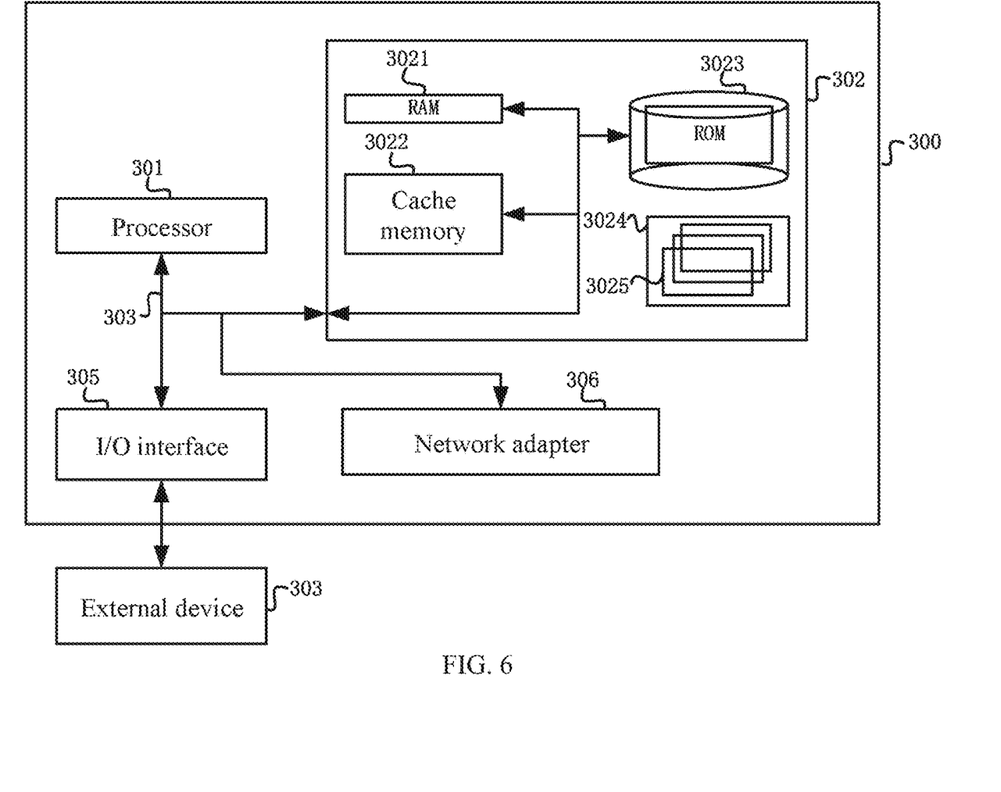
FIG. 6 is a functional structural diagram of electronic device according to an embodiment of the present application.

Based on the foregoing embodiment, this embodiment of the present application further provides an electronic device. Refer to FIG. 6. An electronic device 300 provided in this embodiment of the present application at least includes a processor 301, a memory 302, and a computer program that is stored in the memory 302 and that is executable on the processor 301. The processor 301, when executing the computer program, implements the method for collaborative end-to-end large model-oriented self-driving trajectory decision-making provided in this embodiment of the present application.

The electronic device 300 provided in this embodiment of the present application may further include a bus 303 connecting different components (including the processor 301 and the memory 302). The bus 303 may represent one or more of several types of bus structures, including a memory bus, a peripheral bus, a local bus, and the like.

The memory 302 may include a readable medium in the form of a volatile memory, for example, a random access memory (RAM) 3021 and/or a cache memory 3022, and may further include a read-only memory (ROM) 3023.

The memory 302 may further include a program tool 3025 having a set of (at least one) program modules 3024. The program module 3024 includes, but not limited to, an operating subsystem, one or more applications, other program modules, and program data. Each or a combination of these examples may include an implementation in a network environment.

The electronic device 300 may also communicate with one or more external devices 304 (for example, a keyboard, or a remote control), and may also communicate with one or more devices (for example, a mobile phone, and a computer) that cause a user to interact with the electronic device 300, and/or with any device that causes the electronic device 300 to communicate with one or more other electronic devices 300 (for example, a router or a modem). This communication may be performed via an input/output (I/O) interface 305. In addition, the electronic device 300 may also communicate with one or more networks (for example, a local area network (LAN), a wide area network (WAN), and/or a public network such as the internet) through a network adapter 306. As shown in FIG. 6, the network adapter 306 communicates with other modules of the electronic device 300 via the bus 303. It should be appreciated that although not shown in FIG. 6, other hardware and/or software modules may be used in combination with the electronic device 300, including, but not limited to, microcode, a device drive, a redundant processor, an external disk drive array, a disk array (redundant array of independent disks (RAID) subsystem, a tape drive, and a data backup storage subsystem.

It needs to be noted that the electronic device 300 shown in FIG. 6 is only an example, but should not constitute any limitation to the functions and use scope of the embodiments of the present application.

Embodiments of the present application further provide a computer-readable storage medium, the computer-readable storage medium storing computer instructions, the computer instructions being executed by a processor to implement the method for collaborative end-to-end large model-oriented self-driving trajectory decision-making provided in the embodiments of the present application. Specifically, the executable program may be embedded or installed in the electronic device 300. In this way, the electronic device 300 may implement, by executing the embedded or installed executable program, the method for collaborative end-to-end large model-oriented self-driving trajectory decision-making provided in this embodiment of the present application.

The method for collaborative end-to-end large model-oriented self-driving trajectory decision-making provided in this embodiment of the present application may alternatively be implemented as a program product. The program product includes program code. When the program product is run on the electronic device 300, the program code is used to cause the electronic device 300 to perform the method for collaborative end-to-end large model-oriented self-driving trajectory decision-making provided in this embodiment of the present application.

The program product provided in this embodiment of the present application may use any combination of one or more readable media. The readable medium may be a readable signal medium or a readable storage medium. The readable storage medium may be, but not limited to, an electronic, magnetic, optical, electromagnetic, infrared, or semiconductor system, apparatus or device, or any combination of the foregoing. Specifically, more specific examples (a non-exhaustive list) of the readable storage medium include: an electrical connection having one or more wires, a portable disc, a hard disk, a RAM, a ROM, an erasable programmable read-only memory (EPROM), an optical fiber, a portable compact disc read-only memory (CD-ROM), an optical storage device, a magnetic storage device, or any appropriate combination of the foregoing.

The program product provided in this embodiment of the present application may use a CD-ROM and includes program code, or may be run on a computing device. However, the program product provided in this embodiment of the present application is not limited thereto. In the embodiments of the present application, the readable storage medium may be any tangible medium that contains or stores a program. The program may be used by or in combination with an instruction execution system, apparatus or device.

It should be noted that although a plurality of units or subunits of the apparatus have been mentioned in the above detailed description, this partition is merely exemplary but not compulsory.

Actually, according to the embodiments of the present application, features and functions of two or more units as described above may be embodied in one unit. In contrast, features and functions of one unit as described above may be further embodied in more units.

In addition, although the operations of the method in the present application are described in the accompanying drawings in a particular order, it is not required or implied that the operations must be performed in a particular order or that all of the operations shown must be performed to achieve the desired result. Additionally or alternatively, some steps may be omitted, a plurality of steps may be combined into one step for execution, and/or one step may be divided into a plurality of steps for execution.

Finally, it should be noted that the foregoing embodiments are merely intended for describing the technical solutions of the present application rather than limiting the present application. Although the present application is described in detail with reference to the embodiments, persons of ordinary skill in the art should understand that they may still make modifications or equivalent replacements to the technical features of the present application without departing from the spirit and scope of the technical solutions of the present application. These modifications or equivalent replacements shall all fall within the scope of the claims the present application.

What is claimed is:

1. A method for collaborative end-to-end large model-oriented self-driving trajectory decision-making, comprising:
obtaining a red green blue (RGB) image from an ego vehicle, an RGB image from a surrounding vehicle, an RGB image from a road-side, and point cloud data of the road-side in a target region at a current moment;
processing the RGB image from the ego vehicle by using a first feature extraction network to obtain a first image feature, processing the RGB image from the surrounding vehicle by using the first feature extraction network to obtain a second image feature, and processing the RGB image from the road-side by using the first feature extraction network to obtain a third image feature;

fusing the first image feature, the second image feature, and the third image feature to obtain an image fusion feature;

processing the point cloud data of the road-side by using a second feature extraction network to obtain a road-side point cloud feature;

processing the image fusion feature and the road-side point cloud feature to obtain a first bird's eye view (BEV) feature and a second BEV feature;

fusing the first BEV feature and the second BEV feature to obtain a fused BEV feature; and fusing prompt information representing a user intention and the fused BEV feature by using a large vision language model to obtain text information, and then processing the text information by using a natural language large model to obtain an ego vehicle trajectory decision-making result;

wherein the step of processing the image fusion feature and the road-side point cloud feature to obtain the first BEV feature and the second BEV feature comprises:

processing the image fusion feature by using a deformable cross-attention network to obtain the first BEV feature $F_{im}^{BEV}$:

$$F_{im}^{BEV} = \Sigma_i \Sigma_j \text{DeformAttn}(Q, P(S_j, F_{im}^i)),$$

wherein Q is a to-be-learned BEV parameter; $P(S_j, F_{im}^i)$ denotes a result of projecting a $j^{th}$ three-dimensional point $S_j$ onto an $i^{th}$ channel $F_{im}^i$ of the image fusion feature $F_{im}$; and DeformAttn( ) denotes the deformable cross-attention network;

processing the road-side point cloud feature by using a deformable cross-attention mechanism network to obtain the second BEV feature $F_{LiD}^{BEV}$:

$$F_{LiD}^{BEV} = \Sigma_i \Sigma_j \text{DeformAttn}(Q, P(S_j, F_{LiD}^i)),$$

wherein $P(S_j, F_{LiD}^i)$ denotes a result of projecting the $j^{th}$ three-dimensional point $S_j$ onto an $i^{th}$ channel $F_{LiD}$ of the road-side point cloud feature $F_{LiD}^i$; and transforming the second BEV feature $F_{LiD}^{BEV}$ into a coordinate system with the ego vehicle as a center.

2. The method according to claim 1, wherein the step of fusing the first image feature, the second image feature, and the third image feature to obtain the image fusion feature comprises:

processing the first image feature by using a first 1×1 convolution layer to obtain a first key vector $K^{sv}$, a first value vector $V^{sv}$, and a query vector $Q^{sv}$;

processing the second image feature by using a second 1×1 convolution layer to obtain a second key vector $K^{VR}$ and a second value vector $V^{VR}$; and processing the third image feature by using a third 1×1 convolution layer to obtain a third key vector $K^{vr}$ and a third value vector $V^{vr}$, wherein a first fusion feature $F_1$ is:

$$F_1 = \text{softmax}\left(\frac{Q^{sv}K^{sv}}{\sqrt{d_k}}\right)V^{sv},$$

a second fusion feature $F_2$ is:

$$F_2 = \text{softmax}\left(\frac{Q^{sv}K^{VR}}{\sqrt{d_k}}\right)V^{VR},$$

a third fusion feature $F_3$ is:

$$F_3 = \text{softmax}\left(\frac{Q^{sv}K^{vr}}{\sqrt{d_k}}\right)V^{vr},$$

and the image fusion feature $F_{im}$ is:

$$F_{im} = F_1 + F_2 + F_3,$$

wherein $d_k$ denotes a dimension of the first key vector $K^{sv}$.

3. The method according to claim 1, wherein the step of fusing the first BEV feature and the second BEV feature to obtain the fused BEV feature comprises:

performing a dimension reduction on the first BEV feature by using a first 3×3 convolution layer to obtain a dimension-reduced first BEV feature;

processing the dimension-reduced first BEV feature by using an adaptive global average pooling operation to obtain a first global feature;

performing the dimension reduction on the first global feature by using a fourth 1×1 convolution layer to obtain a dimension-reduced first global feature;

normalizing the dimension-reduced first global feature to obtain a first weight feature map;

calculating a product of the first BEV feature and the first weight feature map by using a first multiplier to obtain a weighted first BEV feature;

performing the dimension reduction on the second BEV feature by using a second 3×3 convolution layer to obtain a dimension-reduced second BEV feature;

processing the dimension-reduced second BEV feature by using a second adaptive global average pooling operation to obtain a second global feature;

performing the dimension reduction on the second global feature by using a fifth 1×1 convolution layer to obtain a dimension-reduced second global feature;

normalizing the dimension-reduced second global feature to obtain a second weight feature map;

calculating a product of the second BEV feature and the second weight feature map by using a second multiplier to obtain a weighted second BEV feature; and concatenating the weighted first BEV feature and the weighted second BEV feature to obtain the fused BEV feature.

4. The method according to claim 1, wherein the first feature extraction network is ResNet101; and the second feature extraction network is VoxelNet.

5. The method according to claim 3, wherein the method further comprises a step of performing joint training on the first feature extraction network, the second feature extraction network, a first 1×1 convolution layer, a second 1×1 convolution layer, a third 1×1 convolution layer, the deformable cross-attention network, the first 3×3 convolution layer, the fourth 1×1 convolution layer, the second 3×3 convolution layer, and the fifth 1×1 convolution layer.

6. An apparatus for collaborative end-to-end large model-oriented self-driving trajectory decision-making, comprising:

an obtaining unit, configured to obtain an RGB image from an ego vehicle, an RGB image from a surrounding vehicle, an RGB image from a road-side, and point cloud data of the road-side in a target region at a current moment;

a first processing unit, configured to process the RGB image from the ego vehicle by using a first feature extraction network to obtain a first image feature, process the RGB image from the surrounding vehicle by using the first feature extraction network to obtain a second image feature, and process the RGB image from the road-side by using the first feature extraction network to obtain a third image feature;

a first fusion unit, configured to fuse the first image feature, the second image feature, and the third image feature to obtain an image fusion feature;

a second processing unit, configured to process the point cloud data of the road-side by using a second feature extraction network to obtain a road-side point cloud feature;

a third processing unit, configured to process the image fusion feature and the road-side point cloud feature to obtain a first BEV feature and a second BEV feature;

a second fusion unit, configured to fuse the first BEV feature and the second BEV feature to obtain a fused BEV feature; and a trajectory decision-making unit, configured to fuse prompt information representing a user intention and the fused BEV feature by using a large vision language model to obtain text information, and then process the text information by using a natural language large model to obtain an ego vehicle trajectory decision-making result;

wherein the third processing unit is further configured to:
process the image fusion feature by using a deformable cross-attention network to obtain the first BEV feature $F_{im}^{BEV}$:

$$F_{im}^{BEV} = \Sigma_i \Sigma_j \text{DeformAttn}(Q, P(S_j, F_{im}^i)),$$

wherein Q is a to-be-learned BEV parameter; $P(S_j, F_{im}^i)$ denotes a result of projecting a $j^{th}$ three-dimensional point $S_j$ onto an $i^{th}$ channel $F_{im}^i$ of the image fusion feature $F_{im}$; and DeformAttn( ) denotes the deformable cross-attention network;

process the road-side point cloud feature by using a deformable cross-attention mechanism network to obtain the second BEV feature $F_{LiD}^{BEV}$:

$$F_{LiD}^{BEV} = \Sigma_i \Sigma_j \text{DeformAttn}(Q, P(S_j, F_{LiD}^i)),$$

wherein $P(S_j, F_{LiD}^i)$ denotes a result of projecting the $j^{th}$ three-dimensional point $S_j$ onto an $i^{th}$ channel $F_{LiD}^i$ of the road-side point cloud feature $F_{LiD}^i$; and transform the second BEV feature $F_{LiD}^{BEV}$ into a coordinate system with the ego vehicle as a center.

7. An electronic device, comprising: a memory, a processor, and a computer program stored in the memory and configured to be executed by the processor, wherein the processor, when executing the computer program, implements the method according to claim 1.

8. A non-transitory computer-readable storage medium, wherein the computer-readable storage medium stores a computer program, and the computer program is run by a processor to implement the method according to claim 1.

9. The electronic device according to claim 7, wherein in the method, the step of fusing the first image feature, the second image feature, and the third image feature to obtain the image fusion feature comprises:

processing the first image feature by using a first 1×1 convolution layer to obtain a first key vector $K^{sv}$, a first value vector $V^{sv}$, and a query vector $Q^{sv}$;

processing the second image feature by using a second 1×1 convolution layer to obtain a second key vector $K^{VR}$ and a second value vector $V^{VR}$; and processing the third image feature by using a third 1×1 convolution layer to obtain a third key vector $K^{vr}$ and a third value vector $V^{vr}$, wherein a first fusion feature $F_1$ is:

$$F_1 = \text{softmax}\left(\frac{Q^{sv} K^{sv}}{\sqrt{d_k}}\right) V^{sv},$$

a second fusion feature $F_2$ is:

$$F_2 = \text{softmax}\left(\frac{Q^{sv} K^{VR}}{\sqrt{d_k}}\right) V^{VR},$$

a third fusion feature $F_3$ is:

$$F_3 = \text{softmax}\left(\frac{Q^{sv} K^{VR}}{\sqrt{d_k}}\right) V^{VR},$$

and
the image fusion feature $F_{im}$ is:

$$F_{im} = F_1 + F_2 + F_3,$$

wherein $d_k$ denotes a dimension of the first key vector $K^{sv}$.

10. The electronic device according to claim 7, wherein in the method, the step of fusing the first BEV feature and the second BEV feature to obtain the fused BEV feature comprises:

performing a dimension reduction on the first BEV feature by using a first 3×3 convolution layer to obtain a dimension-reduced first BEV feature;

processing the dimension-reduced first BEV feature by using an adaptive global average pooling operation to obtain a first global feature;

performing the dimension reduction on the first global feature by using a fourth 1×1 convolution layer to obtain a dimension-reduced first global feature;

normalizing the dimension-reduced first global feature to obtain a first weight feature map;

calculating a product of the first BEV feature and the first weight feature map by using a first multiplier to obtain a weighted first BEV feature;

performing the dimension reduction on the second BEV feature by using a second 3×3 convolution layer to obtain a dimension-reduced second BEV feature;

processing the dimension-reduced second BEV feature by using a second adaptive global average pooling operation to obtain a second global feature;

performing the dimension reduction on the second global feature by using a fifth 1×1 convolution layer to obtain a dimension-reduced second global feature;

normalizing the dimension-reduced second global feature to obtain a second weight feature map;

calculating a product of the second BEV feature and the second weight feature map by using a second multiplier to obtain a weighted second BEV feature; and concatenating the weighted first BEV feature and the weighted second BEV feature to obtain the fused BEV feature.

11. The electronic device according to claim 7, wherein in the method, the first feature extraction network is ResNet101; and the second feature extraction network is VoxelNet.

12. The electronic device according to claim 10, wherein the method further comprises a step of performing joint training on the first feature extraction network, the second feature extraction network, a first 1×1 convolution layer, a second 1×1 convolution layer, a third 1×1 convolution layer, the deformable cross-attention network, the first 3×3 convolution layer, the fourth 1×1 convolution layer, the second 3×3 convolution layer, and the fifth 1×1 convolution layer.

13. The non-transitory computer-readable storage medium according to claim 8, wherein in the method, the step of fusing the first image feature, the second image feature, and the third image feature to obtain the image fusion feature comprises:
  processing the first image feature by using a first 1×1 convolution layer to obtain a first key vector $K^{sv}$, a first value vector $V^{sv}$, and a query vector $Q^{sv}$;
  processing the second image feature by using a second 1×1 convolution layer to obtain a second key vector $K^{VR}$ and a second value vector $V^{VR}$; and
  processing the third image feature by using a third 1×1 convolution layer to obtain a third key vector $K^{vr}$ and a third value vector $V^{vr}$,
  wherein a first fusion feature $F_1$ is:

$$F_1 = \mathrm{softmax}\left(\frac{Q^{sv}K^{sv}}{\sqrt{d_k}}\right)V^{sv},$$

a second fusion feature $F_2$ is:

$$F_2 = \mathrm{softmax}\left(\frac{Q^{sv}K^{VR}}{\sqrt{d_k}}\right)V^{VR},$$

a third fusion feature $F_3$ is:

$$F_3 = \mathrm{softmax}\left(\frac{Q^{sv}K^{vr}}{\sqrt{d_k}}\right)V^{vr},$$

the image fusion feature $F_{im}$ is:

$$F_{im}=F_1+F_2+F_3,$$

wherein $d_k$ denotes a dimension of the first key vector $K^{sv}$.

14. The non-transitory computer-readable storage medium according to claim 8, wherein in the method, the step of fusing the first BEV feature and the second BEV feature to obtain the fused BEV feature comprises:
  performing a dimension reduction on the first BEV feature by using a first 3×3 convolution layer to obtain a dimension-reduced first BEV feature;
  processing the dimension-reduced first BEV feature by using an adaptive global average pooling operation to obtain a first global feature;
  performing the dimension reduction on the first global feature by using a fourth 1×1 convolution layer to obtain a dimension-reduced first global feature;
  normalizing the dimension-reduced first global feature to obtain a first weight feature map;
  calculating a product of the first BEV feature and the first weight feature map by using a first multiplier to obtain a weighted first BEV feature;
  performing the dimension reduction on the second BEV feature by using a second 3×3 convolution layer to obtain a dimension-reduced second BEV feature;
  processing the dimension-reduced second BEV feature by using a second adaptive global average pooling operation to obtain a second global feature;
  performing the dimension reduction on the second global feature by using a fifth 1×1 convolution layer to obtain a dimension-reduced second global feature;
  normalizing the dimension-reduced second global feature to obtain a second weight feature map;
  calculating a product of the second BEV feature and the second weight feature map by using a second multiplier to obtain a weighted second BEV feature; and
  concatenating the weighted first BEV feature and the weighted second BEV feature to obtain the fused BEV feature.

15. The non-transitory computer-readable storage medium according to claim 8, wherein in the method, the first feature extraction network is ResNet101; and the second feature extraction network is VoxelNet.

16. The non-transitory computer-readable storage medium according to claim 14, wherein the method further comprises a step of performing joint training on the first feature extraction network, the second feature extraction network, a first 1×1 convolution layer, a second 1×1 convolution layer, a third 1×1 convolution layer, the deformable cross-attention network, the first 3×3 convolution layer, the fourth 1×1 convolution layer, the second 3×3 convolution layer, and the fifth 1×1 convolution layer.

\* \* \* \* \*